United States Patent [19]

Tilley

[11] 4,024,321
[45] May 17, 1977

[54] ALKALI METAL-SULPHUR CELLS

[75] Inventor: Alec R. Tilley, Blackbrook, near Belper, England

[73] Assignee: Chloride Silent Power Limited, London, England

[22] Filed: June 28, 1976

[21] Appl. No.: 700,263

[30] Foreign Application Priority Data
July 3, 1975 United Kingdom ............ 28096/75

[52] U.S. Cl. .............................. 429/104; 429/185
[51] Int. Cl.² ..................................... H01M 2/00
[58] Field of Search ................... 429/104, 185

[56] References Cited
UNITED STATES PATENTS 3,449,165  6/1969  Stott ................................ 429/104
3,841,912  10/1974  Kagawa et al. .................... 429/104

*Primary Examiner*—Anthony Skapars
*Attorney, Agent, or Firm*—Pollock, VandeSande & Priddy

[57] ABSTRACT

An alkali metal-sulphur cell of tubular form, has an inner tubular member constituting the solid electrolyte, an outer tubular member and a current collecting pole extending into the interior of the inner tubular member which forms the cathode compartment of the cell. The outer tubular member, the inner tubular member and the current collecting pole have shoulder formations which abut one another through sealing means and are urged towards one another by axially acting spring means.

5 Claims, 3 Drawing Figures

ALKALI METAL-SULPHUR CELLS

This invention relates to alkali metal-sulphur cells, e.g. sodium-sulphur cells, and more paticularly to such cells in which the anode compartment, i.e. the alkali metal containing compartment, is defined by the space between an outer tubular member and an inner tubular member constituting the solid electrolyte of the cell, in which the cathode compartment, i.e. the sulphur/polysulphide containing compartment is defined by the interior of inner tubular member and in which a current collecting pole extends into the cathode compartment.

The object of the present invention is to provide a closure and sealing arrangement for closing off the tubular members at one end of the cell.

According to the invention, in a cell of the above described construction the outer tubular member, the inner tubular member and the current collecting pole have shoulder formations which abut one another through sealing means and are urged towards one another by spring means acting in the axial direction of the tubular member.

The shoulder formations may slope relatively to the axes of the tubular members or they may extend at right angles thereto.

Three sodium-sulphur cell constructions in accordance with the present invention will now be described by way of example with reference to the accompanying diagrammatic drawings, in which.

Throughout the drawings the same reference numerals having been used to denote corresponding parts.

Figure 1:
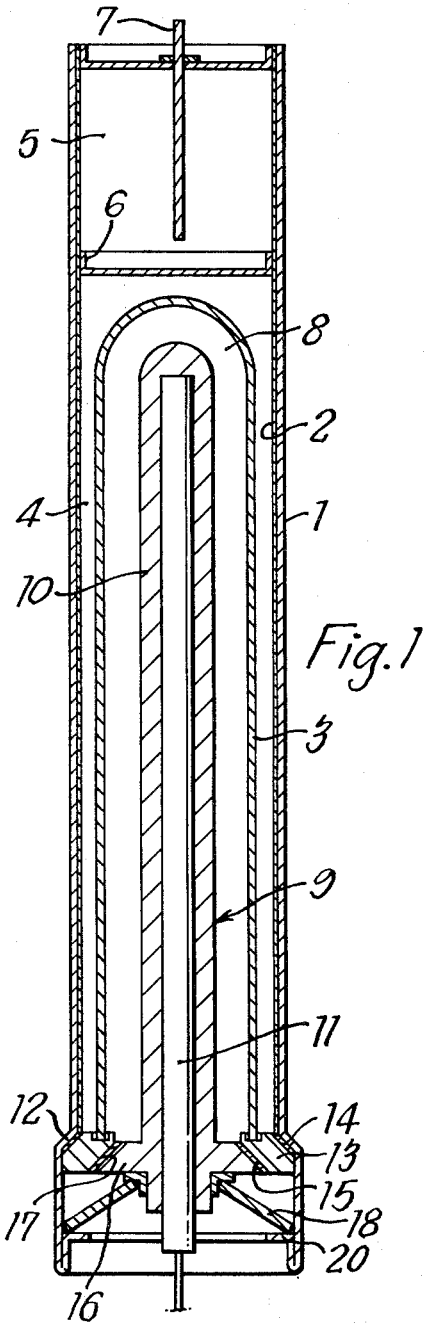
FIG. 1 shows a sectional elevation of the first construction.

Referring now to FIG. 1, the cell is shown in its operating orientation and has a mild steel outer case 1 with an internal coating 2 of vitreous enamel and an inner co-axial electrolyte tube 3 both of which are closed at their upper ends. The space 4 between the casing 1 and tube 3 constitutes the anode compartment and contains sodium. The casing 1 extends above the tube 3 to form a sodium reservoir 5 which is separated from the compartment 4 by a sodium flow-restrictor 6. The case 1 forms the negative current collecting pole of the cell and has a terminal 7 connected to it.

The interior 8 of the electrolyte tube 3 constitutes the cathode compartment of the cell and contains sulphur/polysulphides in proportions dependent upon the state of charge of the cell. Extending axially within the tube 3 is the positive current collecting pole 9. This comprises an outer tubular graphite member 10 and an inner rod 11 of high conductivity metal which is in intimate contact with the internal surface of the member 10.

The lower open ends of the casing 1 and tube 3 are closed off and sealed by a compression seal arrangement. For this purpose the outer casing 1, the tube 3 and current collecting pole 9 are provided with shoulder formations which abut one another. Thus the casing 1 has an internal sloping shoulder 12 which is formed by shaping of the casing 1. The tube 3 has an alpha-alumina flange 13 whose outer and inner peripheries have sloping shoulders 14 and 15, the shoulder 14 abutting the shoulder 12 of the casing 1. The graphite member 10 of the current collecting pole 9 is formed with a flange 16 whose outer periphery is formed as a sloping shoulder 17 which abuts the shoulder 15 of the alpha-alumina flange 13. An aluminium gasket is positioned between the shoulders 12 and 14 as sealing means, and a Grafoil gasket is positioned between the shoulders 15 and 17 as sealing means.

The shoulders are urged towards one another by annular disc spring 18 which acts in the axial direction of the tube 3. The inner periphery engages the graphite member 10 of the current collecting pole 9 through insulating ring 19 and the outer periphery of the spring 18 engages beneath a shoulder 20 formed by turning the lower edge of the case 1 in upon itself. Alternatively a flange could be welded to the case 1 to provide the shoulder 20.

It will be appreciated that the sloping shoulder formations produce a wedging effect.

Figure 2:
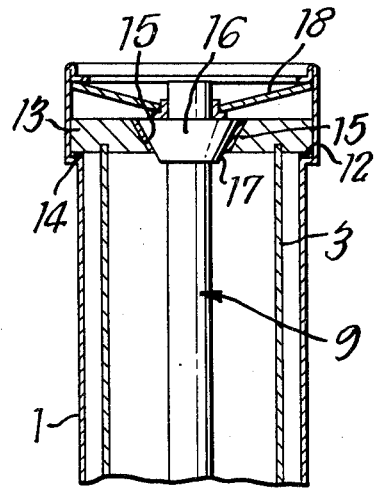
FIGS. 2 and 3 show sectional elevations of parts of the second and third constructions respectively.
Figure 3:
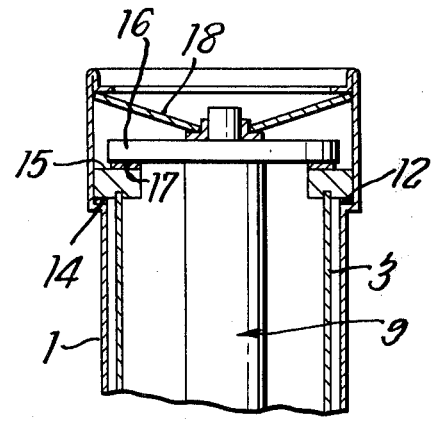

The construction shown in FIG. 2 is substantially the same as that of FIG. 1 except that the abutting shoulder formations 12 and 13 on the casing 1 and the alpha-alumina flange extend at right angles to the axes of the casing 1 and tube 2. The construction of FIG. 3 is further modified compared with that of FIG. 1 in that all the abutting shoulder formations 12, 14, 15 and 17 extend at right angles to the axes of the casing 1, tube 2 and current collecting pole 9. In a further modification, the FIG. 3 construction could have two disc springs 18, disposed back-to-back, so that they abut each other at their inner peripheries. Then the outer periphery of the lower spring 18 would engage the flange 16 adjacent its outer edge and would thus apply an axial compression force substantially in line with the sealing gaskets

I claim:

1. An alkali metal-sulphur cell in which the anode compartment is defined by the space between an outer tubular member and an inner tubular member constituting the solid electrolyte of the cell, the cathode compartment is defined by the interior of the inner tubular member and a current collecting pole extends into the cathode compartment, wherein the outer tubular member, the inner tubular member and the current collecting pole have shoulder formations which abut one another through sealing means and are urged towards one another by spring means acting in the axial direction of the tubular member.

2. An alkali metal-sulphur cell according to claim 1, wherein at least some of said shoulder formations slope relatively to the axes of the tubular members to provide a wedging action between them under the force of said spring means.

3. An alkali metal-sulphur cell according to claim 2, wherein all said shoulder formations slope relatively to the axes of the tubular members.

4. An alkali metal-sulphur cell according to claim 2, wherein the abutting shoulder formations between said outer tubular member and said inner tubular member extend at right angles to the axes of said tubular member and the abutting shoulder formations between said inner tubular member and said current collecting pole slope relatively to said axes.

5. An alkali metal-sulphur cell according to claim 1, wherein said spring means comprises an annular disc spring, engaging said current collecting pole by its inner periphery and engaging beneath an inturned shoulder on said outer tubular member.

* * * * *